United States Patent [19]

Dorner et al.

[11] Patent Number: 4,817,738
[45] Date of Patent: Apr. 4, 1989

[54] PORTABLE HANDHELD MOTOR-DRIVEN TOOL

[75] Inventors: Wolfgang Dorner, Rottenburg; Michael Leuchte, Stuttgart; Klaus Bröckel, Rottenburg, all of Fed. Rep. of Germany

[73] Assignee: Andreas Stihl, Waiblingen, Fed. Rep. of Germany

[21] Appl. No.: 84,213

[22] Filed: Aug. 12, 1987

[30] Foreign Application Priority Data

Aug. 27, 1986 [DE] Fed. Rep. of Germany ....... 3629039

[51] Int. Cl.⁴ ............................. F21B 3/00; F16C 1/06
[52] U.S. Cl. .................................. 173/162.1; 30/276; 464/52; 464/180
[58] Field of Search ..................................... 464/51–53, 464/57, 58, 170, 178, 180; 30/276, 296 R; 173/162.1; 56/12.7

[56] References Cited

U.S. PATENT DOCUMENTS 4,491,184  1/1985  Kawalarazuka ................. 30/276 X
4,714,447  12/1987  Hironaka ............................ 30/276

Primary Examiner—Douglas D. Watts
Attorney, Agent, or Firm—Walter Ottesen

[57] ABSTRACT

A portable handheld motor-driven tool such as a brushcutter or the like drives a work tool via a drive shaft. The drive shaft is coupled to the motor shaft and is journalled in the motor housing by means of damping member. The respective longitudinal axes of the motor shaft and drive shaft are displaced with respect to each other to prevent vibrations during operation of the motor-driven tool.

8 Claims, 3 Drawing Sheets

4,817,738

PORTABLE HANDHELD MOTOR-DRIVEN TOOL

FIELD OF THE INVENTION

A portable handheld motor-driven tool such as a brushcutter has a drive motor and a shaft driving a working tool. The drive shaft is coupled to the motor shaft and is journalled in a damping member at the end thereof facing toward the motor.

BACKGROUND OF THE INVENTION

Brushcutters of the type described above have cutting tools in the form of a circular knife or a star-shaped knife. The cutting tool can also be a rotating plastic filament which is metered from a supply spool as required. The drive shaft which leads from the motor shaft to the cutting tool is relatively long and is loaded by the weight of the motor under operating conditions. This causes transverse forces to develop which lead to constraints in the connection between the motor shaft and the drive shaft. The vibrations occurring in this manner are troublesome for the operator of the portable tool and can not be adequately damped by means of a damping member because to motor shaft and the drive shaft do not maintain their predetermined aligned end position. The vibrations which occur for example in the frequency range of between 800 to over 1300 Hertz also load the supporting tube and the bearing means of the drive shaft. The vibrations lead to a premature tiring of the operator and cause an increased wear of the portable tool.

SUMMARY OF THE INVENTION

It is an object of the invention to provide a portable tool of the kind referred to above which is configured so that the occurrence of vibrations is substantially prevented.

This achieved according to a feature of the portable tool of the invention wherein the motor shaft and the drive shaft of the cutting tool are arranged with respect to each other so that their respective longitudinal axes are displaced relative to one another.

The positions of the motor shaft and the drive shaft are preset so as to be axially displaced with respect to each other. This preset in combination with the elastic support provided by the damping member cause the two shafts to adjust to each other so that the two shafts are mutually aligned under operating conditions with a balancing of the occurring transverse forces. The axial displacement for the rest condition of the two shafts is determined by considering the forces occurring during operation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
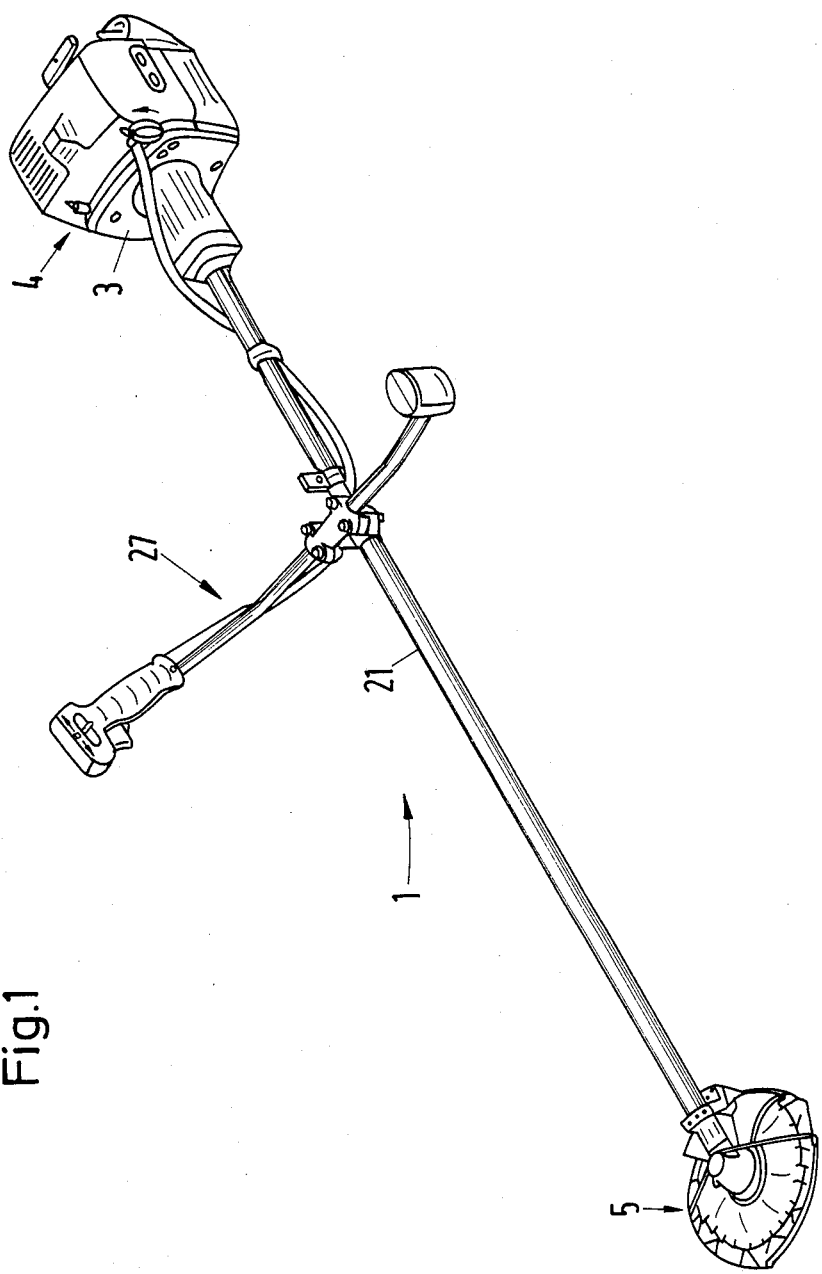
FIG. 1 is a perspective view of a brushcutter according to the invention.

FIG. 1 provides an overview of a brushcutter 1 which includes a holding handle 27 on which operating controls for the operator are mounted. The holding handle 27 is mounted on the supporting tube 21 which has one end attached to the housing 3 of the drive motor 4 and the other end thereof connected to the cutterhead 5. The cutterhead 5 is equipped with a conventional cutting tool which is not shown in detail in FIG. 1. Such a brushcutter is used for cutting lawn edges, thickets, brush and bushes. The brushcutter can also be used to mow uneven slopes and planted median strips of highways and the like.

Figure 2:
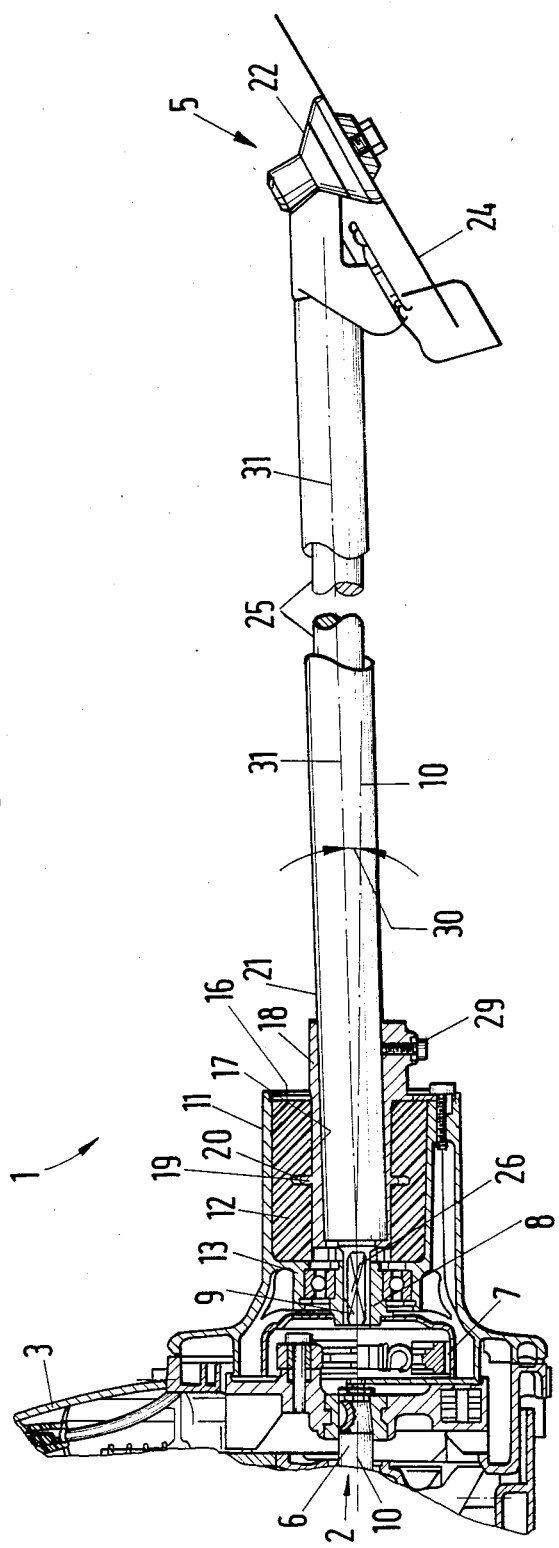
FIG. 2 is a side elevation view, partially in section, of the brushcutter of FIG. 1; and, FIG. 3 is a schematic representation of the motor and the drive shaft to show the angular deviation of the longitudinal axis of the drive shaft with respect to the longitudinal axis of the motor shaft.

The end 6 of the crankshaft 2 of the motor mounted in housing 3 can be seen in FIG. 2. The crankshaft 2 drives the drive shaft 25 disposed in the supporting tube 21 via a centrifugal clutch 7. The shaft 25 drives a cutting tool 24 which is journalled in the cutterhead 5.

The drive motor 4 can be an internal combustion engine; however, it may also be an electrical motor.

The centrifugal clutch 7 is rigidly connected with a bearing sleeve 8 at its output end. The bearing sleeve 8 has a four-edged receiving opening 9 for receiving therein the four-sided pin 26 of the drive shaft 25 in a form-tight manner.

The housing 3 is extended to define a tubular support 11 which encloses the anti-vibration component or damping member 12. The damping member 12 is made of rubber-elastic materials; however, it can also be assembled from steel springs. The damping member 12 is essentially cylindrical and is braced with its respective end faces on an end wall of the housing 3 and on end disc 16 covering the forward end of the support 11. The end disc 16 is attached to the support 11 by means of threaded fasteners. The outer casing face of the damping member lies against the inner wall of the support 11.

The damping member 12 has a clear-through opening 17 which is cylindrical and coaxial to longitudinal axis 10 of the crankshaft 2. The inner end of a sleeve 18 lies without play in the clear-through opening 17. The sleeve 18 has at least one radial projection 19 which engages in opening 20 in the damping member 12 to protect against axial displacement of the sleeve 18 out of the support 11. In this way, the sleeve 18 is elastically supported in the damping member 12 so that it is somewhat moveable radially and axially in dependence upon the elasticity of the damping member.

The supporting tube 21 is secured in the sleeve 18 and has a length which is usually approximately 100 cm. The cutterhead 5 is mounted at the other end of the supporting tube. The cutterhead 5 includes an end piece which defines a housing 22 for the gear means via which the drive shaft 25 drives the cutter tool which in the embodiment shown is a circular knife 24. The supporting tube 21 is inserted without play in the sleeve 18 and is clamped in place with a clamping screw 29.

The bore axis 31 of the sleeve 18 is coincident with the respective longitudinal axes of the supporting tube 21 and drive shaft 25. The bore axis 31 is aligned so as to conjointly define an angle with the axis 10 of the crankshaft 2. The two axes 10 and 31 conjointly define an acute angle 30 which opens in the direction toward the cutterhead 5 when the apparatus is at rest. In the embodiment shown, this acute angle is 1.4° and lies preferably in the range between approximately 0.5° and 5°. The transverse forces caused primarily by the weight of the drive motor 4 are cancelled with this arrangement. With the axes 10 and 31 aligned with each other, these forces would lead to deformations in the connection between the four-edge pin 26 and the coupling 7. In contrast and with the journalling described above, the shafts 10 and 31 can align themselves with respect to each other during operating conditions. The angle 30 which is to be set is preferably determined when the apparatus is manufactured and takes into consideration the weight of the motor and the elasticity of the damping member 12.

Figure 3:
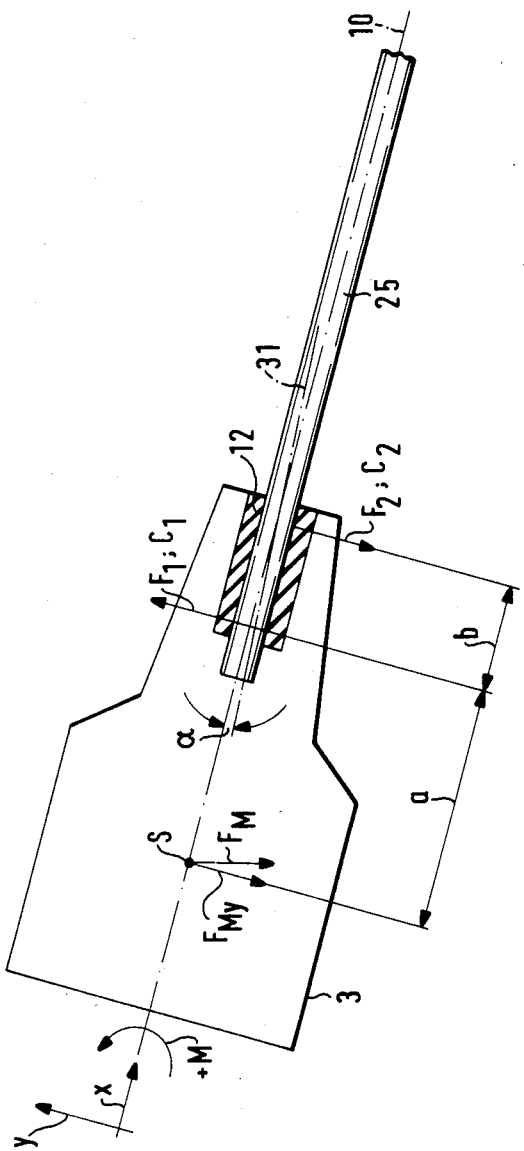

Referring to FIG. 3, this angle which is here identified as $\alpha$ can be determined by computing the summation of the transverse moments and forces produced by the motor during operation. Reference letter S in FIG. 3 designates the center of gravity of the motor assembly. Thus, the angle $\alpha$ can be computed by making summations of the forces and moments shown in FIG. 3, which occur during operation of the motor, as delineated below:

$$\Sigma F_y = 0; \quad -F_{My} + F_1 - F_2 = 0$$

$$\Sigma M_S = 0; \quad F_1 \cdot a - F_2(a + b) = 0$$

$$F_1 = \frac{F_{My}}{\left(1 - \frac{a}{a+b}\right)}$$

$$F_2 = F_{My} \left[ \frac{1}{\left(1 - \frac{a}{a+b}\right)} - 1 \right]$$

$$y_1 = \frac{F_1}{C_1} = \frac{F_{My}}{C_1} \cdot \left[ \frac{1}{\left(1 - \frac{a}{a+b}\right)} \right]$$

$$y_2 = \frac{F_2}{C_2} = \frac{F_{My}}{C_2} \cdot \left[ \frac{1}{\left(1 - \frac{a}{a+b}\right)} - 1 \right]$$

$$\alpha = \arctan \left[ \frac{\left| \frac{F_{My}}{C_1} \cdot \frac{1}{\left(1 - \frac{a}{a+b}\right)} \right| + \left| \frac{F_{My}}{C_2} \left[ \frac{1}{\left(1 - \frac{a}{a+b}\right)} - 1 \right] \right|}{b} \right]$$

Wherein the dimensions a and b are as shown in FIG. 3.

As a consequence of the self-acting alignment of the axes 10 and 31 in aligned positions with an elastic deformation of the damping member 12, vibrations in the drive system are prevented. In addition, wear of the shaft pin 26 is reduced to a minimum.

The angular displacement of the axes 10 and 31 can also be obtained by means of a suitable formation of the support 11 in which the rubber-elastic damping member 12 is supported. For this purpose, a suitable configuration of the elastic damping member 12 can be selected. It is further possible to displace the two axes 10 and 31 in parallel position with respect to each other.

It is understood that the foregoing description is that of the preferred embodiments of the invention and that various changes and modifications may be made thereto without departing from the spirit and scope of the invention as defined in the appended claims.

What is claimed is:

1. A portable handheld, motor-driven tool equipped with a work tool, the motor-driven tool comprising:
   a housing;
   a drive motor mounted in said housing and having a motor shaft defining a longitudinal motor shaft axis, said drive motor having a predetermined weight which imparts forces to the motor-driven tool transversely to said axis during the operation thereof;
   a drive shaft defining a longitudinal drive shaft axis and having a first end facing toward said motor;
   coupling means for coupling said motor shaft to said drive shaft at said first end thereof;
   said drive shaft having a second end for driving said work tool;
   a damping member having a predetermined elasticity and being mounted in said housing for elastically supporting said drive shaft at said one end thereof; and, said damping member including holding means for holding said drive shaft at said one end thereof so as to cause said longitudinal axis to be offset with respect to said motor shaft axis by a predetermined offset angle when said motor-driven tool is at rest; said offset angle being selected to permit said longitudinal axis to come into substantial alignment with said motor shaft axis during said operation in response to said forces.

2. A portable handheld, motor-driven tool equipped with a work tool, the motor-driven tool comprising:
a housing;
a drive motor mounted in said housing and having a motor shaft defining a longitudinal motor shaft axis;
a damping member mounted in said housing ahead of said motor;
a drive shaft defining a longitudinal drive shaft axis and having a first end journalled in said damping member so as to face toward said motor;
coupling means for coupling said motor shaft to said drive shaft at said first end thereof;
said drive shaft having a second end for driving said work tool;
means for displacing said drive shaft axis with respect to said motor shaft axis; and,
said means being journalling means for journalling said drive shaft in the region of said damping means so as to provide the displacement between said shafts.

3. The portable handheld motor-driven tool of claim 1, said offset angle being an angle $\alpha$ between said axes opening in a direction toward said second end of said drive shaft, said angle $\alpha$ being an acute angle in the range of $0.5° \leq \alpha \leq 5°$.

4. The portable handheld motor-driven tool of claim 3, said angle $\alpha$ being approximately 1.4°.

5. The portable handheld motor-driven tool of claim 2, said axes being parallel to each other.

6. The portable handheld motor-driven tool of claim 1, comprising: a supporting tube for accommodating and journalling said drive shaft therein; said holding means being a mounting sleeve for receiving said supporting tube therein, said mounting sleeve being mounted in said damping member so as to axially displace said drive shaft with respect to said motor shaft.

7. A portable handheld, motor-driven tool such as a brushcutter or the like equipped with a work tool, the motor-driven tool comprising:
a housing;
a drive motor mounted in said housing and having a motor shaft defining a longitudinal motor shaft axis;
a damping member mounted in said housing ahead of said motor, said damping member having a mounting sleeve disposed therein, said sleeve having a bore defining a bore axis displaced with respect to said motor shaft axis;
a supporting tube mounted in said bore;
a drive shaft journalled in said supporting tube and having a first end facing toward said motor;
coupling means for coupling said motor shaft to said drive shaft at said first end thereof; and,
said drive shaft having a second end for driving said work tool.

8. The portable handheld motor-driven tool of claim 7, said mounting sleeve being disposed in said damping member so as to cause said axes to conjointly define an angle $\alpha$.

* * * * *